Patented Oct. 7, 1941

2,257,788

UNITED STATES PATENT OFFICE 2,257,788

BLUE MONAZO DYE

Herbert W. Daudt, Wilmington, Del., and Donovan E. Kvalnes, Penns Grove, N. J., assignors to E. I. du Pont de Nemours & Company, Wilmington, Del., a corporation of Delaware No Drawing. Application November 22, 1939, Serial No. 305,657

5 Claims. (Cl. 260—207)

This invention relates to water-soluble monazo dyes which are especially suitable for dyeing fibers of cellulose acetate in shades of blue.

Various monazo dyes which are insoluble or sparsely soluble in water and have affinity for cellulose acetate fibers are known. In dyeing with such dyes it is necessary to disperse the dyes in suitable media in order to make dyeings of satisfactory strength. The making of such dispersed dyebaths is an inconvenience in the dyehouse and in general adds to the cost of the dyeing. The operation of dyeing with dispersed dyes has to be conducted with a view to various limitations which are inherent in dispersed dyebaths and this imposes restrictions on the methods of operation and adaptability of the dyes which are not present in soluble types. It is, therefore, desirable to provide water-soluble monazo dyes in shades of blue having affinity for cellulose acetate fibers and other technically satisfactory properties, such as good exhaust value and good fastness to light and washing.

It is among the objects of this invention to provide water-soluble monazo dyes suitable for dyeing and printing of cellulose acetate fibers in shades of blue and having technically satisfactory properties, such as good affinity, excellent penetration, good exhaust so that heavy shades can be obtained economically, good discharge properties, and good fastness to light and washing. Another object is to provide dyes which give dyeings having good fastness upon prolonged exposure to gaseous oxides of nitrogen and other harmful gases frequently present in the atmosphere. Other objects of the invention will be apparent from the following description.

The objects of the invention are attained in general by diazotizing an arylamine represented by the formula

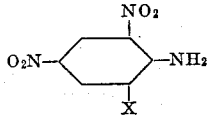

in which X is one of a group consisting of hydrogen, chlorine, bromine, methyl, methoxy, ethoxy, cyano, —CO-alkyl containing 1 to 2 carbons in the alkyl group, —SO$_2$ alkyl containing 1 to 2 carbons in the alkyl group, CF$_3$, and NO$_2$; and coupling with a coupling component represented by the formula

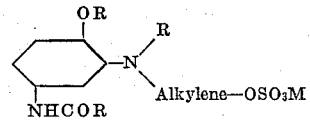

wherein the R's are one or any combination of the group consisting of alkyl having 1 to 4 carbons and hydroxy ethyl, alkylene is —(CH$_2$)$_n$ wherein $n$ is 2 to 3 and M is one of a group consisting of hydrogen, ammonia and the alkali metals.

The invention will be more fully set forth in the following more detailed description which includes examples that are given as illustrative embodiments of the invention and not as limitations thereof. Parts are expressed in parts by weight.

EXAMPLE 1

*2:4-dinitro-aniline→2-methoxy-5-acetylamino, ethyl-sulfato-ethyl-aniline*

A diazo solution was prepared by stirring 19 parts of 2:4-dinitro-aniline into a nitrosyl sulfuric acid, made by introducing 7 parts of sodium nitrite into 120 parts of sulfuric acid (100%). The solution (after two hours of stirring at 25° C.) was poured onto sufficient ice to maintain the temperature at 0° C. and clarified if necessary. The diazo solution was slowly run into a cold solution of 33 parts of 2-methoxy-5-acetylaminoethyl, sulfato-ethyl-aniline. A concentrated solution of sodium acetate was added gradually until the coupling mixture was no longer acid to Congo red paper at which time coupling was completed. The reaction mixture was made alkaline by the addition of a solution of sodium hydroxide and the dark blue sodium salt of the dye was filtered off and dried. The product was soluble in water. From a water solution it dyed cellulose acetate a heavy navy blue shade with good fastness to light and to washing. The compound is represented by the formula

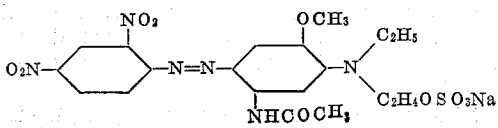

Example 2

6-chlor-2:4-dinitro-aniline→2-methoxy-5-acetyl-amino-ethyl, sulfato-ethyl-aniline Twenty-two parts of 6-chlor-2:4-dinitro-aniline were stirred at 50°–60° C. into nitrosyl sulfuric acid prepared by introducing 7 parts of sodium nitrite into 120 parts of sulfuric acid (100%). This solution was poured onto ice and quickly added to the coupling component described in Example 1. Coupling was completed and the monazo compound in the form of its sodium salt was completed in a manner similar to the procedure described in Example 1. From a water solution the isolated product dyed cellulose acetate a bright blue shade having good discharge properties and good fastness to washing, light and gas fumes. The product is represented by the formula

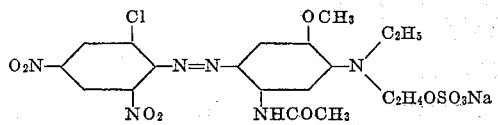

If in place of 6-chloro-2:4-dinitro-aniline, 6-bromo-2:4-dinitro-aniline was used, a dye with similar properties was obtained.

When 2-ethoxy-5-acetyl-amino-ethyl, sulfato-ethyl-aniline, 2-methoxy- or ethoxy-5-propyl-amino-ethyl, sulfato-ethyl-aniline or 2-methoxy- or ethoxy-5-propyl-amino, sulfato-ethyl-aniline was coupled with 6-chloro- or 6-bromo-2:4-dinitro-aniline, dyes with similar properties were obtained. These dyes had deep blue to greenish blue shades with excellent affinity. The dyeings had excellent resistance to gas fumes and discharge properties.

Example 3

2-amino-3:5-dinitro-benzotrifluoride→2-methoxy-5-acetylamino-ethyl-sulfato-ethyl-aniline Twenty-five parts of 2-amino-3:5-dinitro-benzotrifluoride were used instead of the 2:4-dinitro-aniline in Example 1. A dye was obtained which dyed cellulose acetate a greenish blue shade, fast to washing, light and gas fumes and other properties similar to those of Example 2. The product is represented by the formula

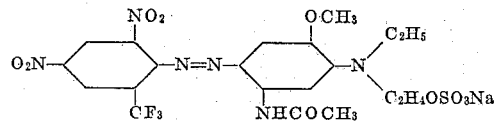

The coupling component 2-methoxy-5-acetyl-amino-ethyl, sulfato-ethyl-aniline may be prepared as follows:

2:4-diamino-anisol is acetylated to give 2-amino-4-acetyl-amino-anisol. The latter is treated stepwise with ethyl bromide and ethylene oxide to give 2-methoxy-5-acetyl-amino-ethyl, hydroxy-ethyl-aniline. This compound is sulfated with concentrated sulfuric acid or with chlor-sulfonic-acid in tetra-chlor-ethane. The coupling component also may be prepared by an alternate series of reactions from 2-amino-4-nitro-anisol.

As illustrative of the many primary arylamines which can be used instead of those indicated in the examples, the following are mentioned, 2,4-dinitro-aniline, 6-chlor-2,4-dinitro-aniline, 6-brom-2,4-dinitro-aniline, 6-trifluor methyl-2,4-dinitro aniline, 2-amino-3,5-dinitro acetophenone (or propiophenone), 2-amino-3,5-dinitro phenyl methyl sulfone, 2-amino-3,5-dinitro phenyl ethyl sulfone, 6-cyano-2,4-dinitro aniline, 6-methyl-2,4-dinitro aniline, 6-methoxy-2,4-dinitro aniline, 6-ethoxy-2,4-dinitro aniline, 2,4,6-trinitro aniline.

Illustrations of compounds which can be used as coupling components to produce the dyes of the invention are the following: 2-methoxy-5-acetylamino ethyl, sulfato ethyl aniline, 2 ethoxy-5-acetylamino ethyl, sulfato ethyl aniline, 2-methoxy-5-propionylamino ethyl, sulfato ethyl aniline, 2-methoxy-5-acetylamino butyl sulfato ethyl aniline, 2-hydroxyethyl-5-acetylamino hydroxy ethyl, sulfato ethyl aniline, 2-methoxy-5-valeryl-amino ethyl, sulfato ethyl aniline, 2-methoxy-5-acetylamino ethyl, sulfato propyl aniline, 2-butyloxy-5-acetylamino ethyl, sulfato ethyl aniline, 2-methoxy-5-acetylamino methyl, sulfato ethyl aniline, 2-methoxy-5-lactoylamino ethyl, sulfato ethyl aniline.

The preferred embodiments of the invention are those in which the diazo components are the indicated substituted dinitro anilines. They are greener in shade and all have good resistance to gas fumes. Of this type the dyes are preferred in which the diazo component is substituted in the 6-position by chloro, bromo or $CF_3$ and the coupling component is represented by the formula

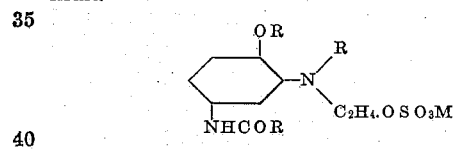

wherein the R's are methyl or ethyl. These have better affinity.

The new azo combinations may be made in the form of their free acids or in the form of the ammonia or the alkali metal salts. The free acid form may be isolated from the coupling medium when the acidity to Congo red paper has been neutralized and before the alkali hydroxide is added. Other salts of the azo compounds can be made by using ammonium hydroxide or the hydroxide of another alkali metal instead of sodium hydroxide, such as potassium hydroxide to make the medium alkaline after coupling has taken place.

From the foregoing disclosure it will be recognized that the invention is susceptible of modification without departing from the spirit and scope thereof and it is to be understood that the invention is not restricted to the specific illustrations thereof herein set forth.

We claim:

1. A water soluble monazo dye represented by the formula

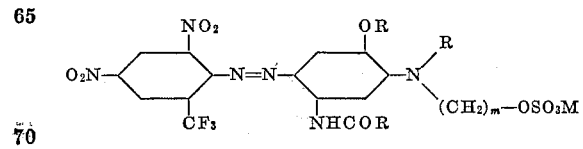

in which the R's are from a group consisting of alkyl having 1 to 4 carbons and hydroxy ethyl; $m$ is 2 to 3 and M is one of a group consisting of hydrogen, ammonium and the alkali metals.

2. A water soluble monazo dye represented by the formula

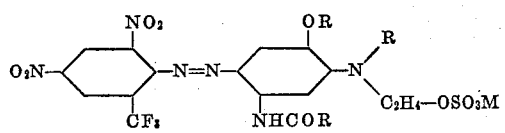

in which the R's are from a group consisting of alkyl having 1 to 4 carbons and hydroxy ethyl and M is one of a group consisting of hydrogen, ammonium and the alkali metals.

3. The compound represented by the formula

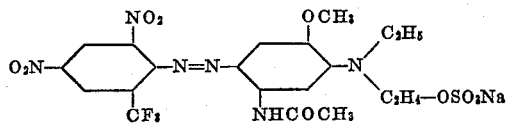

4. The process which comprises diazotizing 2-amino-3:5-dinitro-benzotrifluoride and coupling with a compound represented by the formula

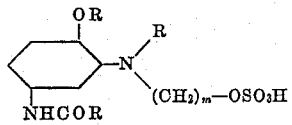

in which the R's are from a group consisting of alkyl having 1 to 4 carbons and hydroxy ethyl, and $m$ is 2 to 3.

5. The process which comprises diazotizing 2-amino-3:5-dinitro-benzotrifluoride and coupling with a compound represented by the formula

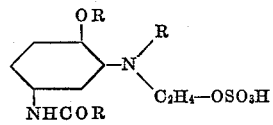

in which the R's are from a group consisting of alkyl having 1 to 4 carbons and hydroxy ethyl.

HERBERT W. DAUDT.
DONOVAN E. KVALNES.